J. G. WINSOR.
IGNITING SYSTEM FOR THE ENGINES OF AUTOMOBILES.
APPLICATION FILED AUG. 7, 1911.

1,042,740.

Patented Oct. 29, 1912.

WITNESSES:
L. L. Bray
V. C. Spratt

INVENTOR.
James G. Winsor
BY
Parker & Burton
ATTORNEY.

UNITED STATES PATENT OFFICE.

JAMES G. WINSOR, OF DETROIT, MICHIGAN.

IGNITING SYSTEM FOR THE ENGINES OF AUTOMOBILES.

1,042,740.     Specification of Letters Patent.     Patented Oct. 29, 1912.

Application filed August 7, 1911. Serial No. 642,591.

*To all whom it may concern:*

Be it known that I, JAMES G. WINSOR, a citizen of the United States, residing at Detroit, county of Wayne, State of Michigan, have invented certain new and useful Improvements in Igniting Systems for the Engines of Automobiles, and declare the following to be a full, clear, and exact description of the same, such as will enable others skilled in the art to which it pertains to make and use the same, reference being had to the accompanying drawings, which form a part of this specification.

Figure 1:
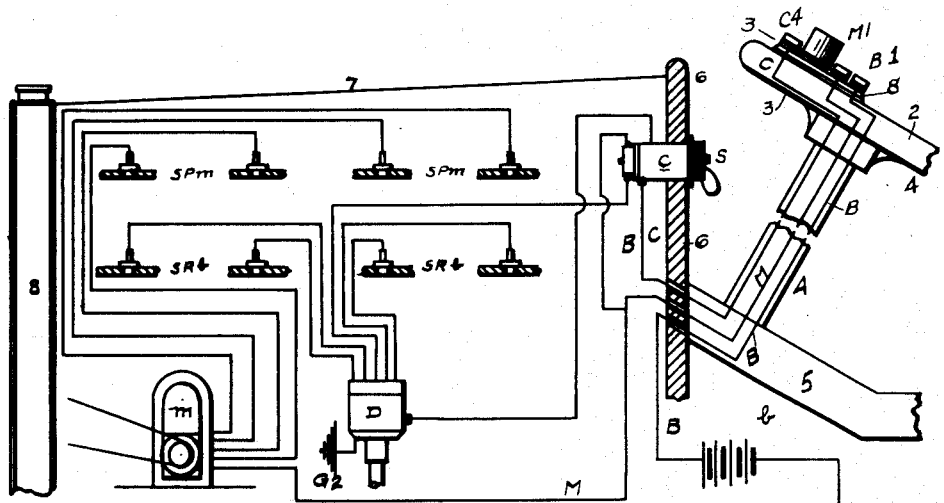
Figure 2:
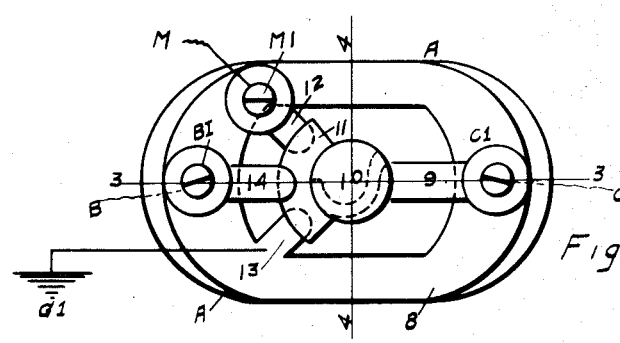
Figure 3:
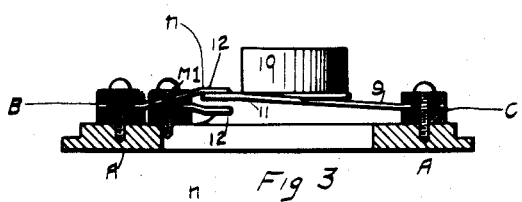
Figure 4:
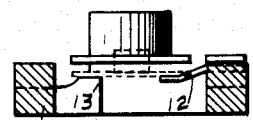
Figure 5:
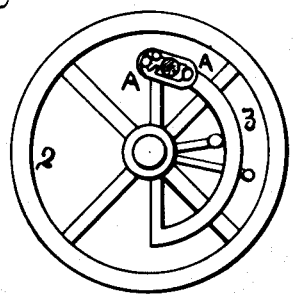

My invention relates to igniting systems for the engines of automobiles, air ships and motor boats, and an object of my improvements is to provide an improved circuit adjuster and one which is placed at a point convenient to the hand of the driver. I accomplish this object in the device illustrated in the accompanying drawings, in which, Figure 1, is a diagrammatic view illustrating the igniting system of an automobile engine and its connection with the automobile. Fig. 2, is an enlarged plan view of an improved circuit adjuster embodying my invention. Fig. 3, is a section on the line 3—3 of Fig. 2. Fig. 4, is a section on the line 4—4 looking from the right of said line. Fig. 5, is a plan view of the steering wheel and quadrant carrying spark and throttle levers showing the location of the circuit adjuster on said quadrant.

2, is the steering wheel, 3, is the quadrant; 4, is the steering post upon which the wheel 2 is mounted.

5, indicates the foot board of the automobile.

6, is the dash; 7, the hood and 8 the radiator.

A, A, is the metal frame of the circuit adjuster, this is grounded on the frame of the engine. The ground is indicated at $G^1$ of Fig. 2.

9, is a spring tongue secured to but insulated from the frame A at a connection $C^1$. Upon the free end of the tongue 9 is a push button 10 and this carries with it the expanded metal piece 11 which is in electrical connection with the spring tongue 9.

14, is a second spring tongue secured at $B^1$ to the frame A but insulated therefrom. The tongue 14 extends over the contact piece 11 and the resiliency of the tongue 9 raises the contact piece 11 against the tongue 14 so as to put the tongue 9 into electrical connection with the tongue 14.

$M^1$ is a binding post upon the frame A but insulated therefrom.

12, is a spring tongue extending under the contact piece 11 and in connection with the post $M^1$.

13, is a lug extending from the frame A under the contact piece 11, its upper surface being on a level with the upper surface of the tongue 12.

$b$, indicates the battery, its positive pole being grounded at G.

C, indicates the coil having the usual switch S by which its various circuits may be adjusted by the foot of the driver or otherwise. A binding post from the coil C is grounded to the frame as indicated at $G^2$.

D, is a distributer for the high tension battery current and a circuit breaker, the distributer sends the current to the various spark plugs $SPb$. as required.

$m$, is a magneto from which the high tension current is conveyed as required to one of the sparks $SPm$.

B, is a conductor extending between the negative binding post of the battery $b$ and the binding post $B^1$ on the frame A. The conductor B is in electrical connection with the tongue 14.

C, is a conductor in electrical connection with the tongue 9, extending from the binding post $C^1$ to one terminal of the primary winding of the coil $c$, the other terminal of the primary coil is grounded through the circuit breaker at $G^2$.

M, is a conductor extending from the magneto to the binding post $M^1$ on the frame A.

The operation of the above described device is as follows:—The circuits may be adjusted in the usual way by the foot or otherwise by means of the switch S.

In the normal position of the adjuster embodying my invention, the battery circuit is operative, the connection being through the conductors B and C, the tongues 9 and 14 and through the ground. When it is desirable to throw the igniting system out of operation, the driver presses down upon the button 10 thus breaking the contact between 11 and 14 and causing the contact piece 11 to bridge the space between the tongue 12 and lug 13 so that the battery circuit is broken and the magneto circuit is grounded through M, the binding post M¹, the tongue 12, the contact piece 11, lug 13 and ground.

I place the improved circuit adjuster above described where it is accessible to the hand of the driver. I have shown it as placed upon the quadrant but it may be placed in any other position convenient to be operative by the driver's hand in an emergency when the driving requires most of his attention and when the feet are otherwise engaged so that the switch S cannot be conveniently used.

I have shown in the drawing, independent magneto and battery circuits but the application of my invention to other forms of ignition systems will be readily seen by those conversant with the art.

S may be in any of three positions, on the battery, on the magneto and battery or on the magneto, and my improved circuit adjuster will operate as an auxiliary in each position.

It will be noticed that the ordinary switch S may have to go through three positions to reach a natural position while my circuit adjusted requires but a single motion to throw the system out of operation.

What I claim is:—

1. In an igniting system for automobiles, an independent magneto circuit, an independent battery circuit, a switch having a tongue 9, a contact point on one side of said tongue, a contact point on the other side of said tongue, said tongue when in contact with one of said points being out of contact with the other of said points, said switch being interposed in the battery circuit so that when said tongue is in contact with one of said points said circuit is complete, and means whereby the contact of said tongue with the other of said points short circuits the magneto circuit.

2. In an ignition system for automobiles, an independent magneto circuit, an independent battery circuit, a switch having a tongue 9, a contact point on one side of said tongue, said tongue when in contact with one of said points being out of contact with the other of said points, a contact point on the other side of said tongue, said switch being interposed in the battery circuit so that when said tongue is in contact with one of said points said circuit is complete, and means whereby the contact of said tongue with the other of said points short circuits the magneto circuit, said switch being located within reach of the hand of the driver when in his normal driving position.

3. In a circuit adjuster, a tongue 9, a contact piece 11 thereon, a contact point 14 upon one side of said contact piece, two contact points 12 and 13 upon the other side of said contact piece, and means for moving said contact piece out of contact with the point 14 and into contact with the points 12 and 13, substantially as and for the purpose described.

4. In a circuit adjuster, a contact piece 11, a contact point 14 upon one side of said contact piece, contact points 12 and 13 upon the other side of said contact piece, an ignition circuit, means for moving said contact piece into contact with the point 14 or with the points 12 and 13, a circuit which is complete at one extreme of the travel of the contact piece 11, and a second circuit, a conductor in electrical connection with said second circuit, and means whereby said conductor is connected to the ground at the other extreme of the travel of said contact piece.

5. The combination of the resilient tongue 9 carrying a contact piece 11 at its end, a contact point 14 extending over said contact piece, the tongue 9 being adapted to carry said contact piece into contact with the point 14 by its resilience, contact points 12 and 13 below said contact piece, so located that when said tongue is pressed downward, said contact piece shall form a connection between the points 12 and 13, the point 13 being grounded, the point 12 being connected to the magneto circuit, and the point 14 and tongue 9 being so connected that when they are in contact, they shall form a part of a complete battery circuit.

In testimony whereof, I sign this specification in the presence of two witnesses.

JAMES G. WINSOR.

Witnesses:
STUART C. BARNES,
ELLIOTT J. STODDARD.